(12) United States Patent
Hock

(10) Patent No.: US 8,952,912 B1
(45) Date of Patent: Feb. 10, 2015

(54) SELECTION OF ELEMENTS ON PAGINATED TOUCH SENSITIVE DISPLAY

(75) Inventor: Martin D. Hock, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 119 days.

(21) Appl. No.: 13/619,177

(22) Filed: Sep. 14, 2012

(51) Int. Cl.
*G06F 3/041* (2006.01)
*G06F 3/033* (2013.01)
*G06F 3/0488* (2013.01)

(52) U.S. Cl.
CPC .......... *G06F 3/0488* (2013.01); *G06F 3/04883* (2013.01)
USPC .......................................... 345/173; 715/863

(58) Field of Classification Search
CPC ............. G06F 3/041; G06F 3/01; G09G 5/00; H05K 7/02
USPC .................................... 345/169, 173; 715/863
See application file for complete search history.

(56) References Cited

U.S. PATENT DOCUMENTS

| 2011/0209103 A1* | 8/2011 | Hinckley et al. | 715/863 |
| 2012/0306772 A1* | 12/2012 | Tan et al. | 345/173 |
| 2013/0328792 A1* | 12/2013 | Myers et al. | 345/173 |

* cited by examiner

*Primary Examiner* — Claire X Pappas
*Assistant Examiner* — Abdul-Samad A Adediran
(74) *Attorney, Agent, or Firm* — Sutherland Asbill & Brennan LLP

(57) ABSTRACT

Systems and methods are disclosed for selecting portions of media content across two or more pages of the media content with paginated display on a touch sensitive display screen. Selections may be made in either the forward or reverse directions.

27 Claims, 8 Drawing Sheets

SELECTION OF ELEMENTS ON PAGINATED TOUCH SENSITIVE DISPLAY

BACKGROUND

Electronic user devices, such as mobile devices and/or electronic book readers, may have touch based user interfaces, such as touch sensitive displays. These touch sensitive displays may be touched with a finger or other elements to provide input to the user devices. The devices often also display text and/or other types of elements on touch sensitive displays. The text and/or other elements may be displayed in a paginated manner, rather than a scrolling display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
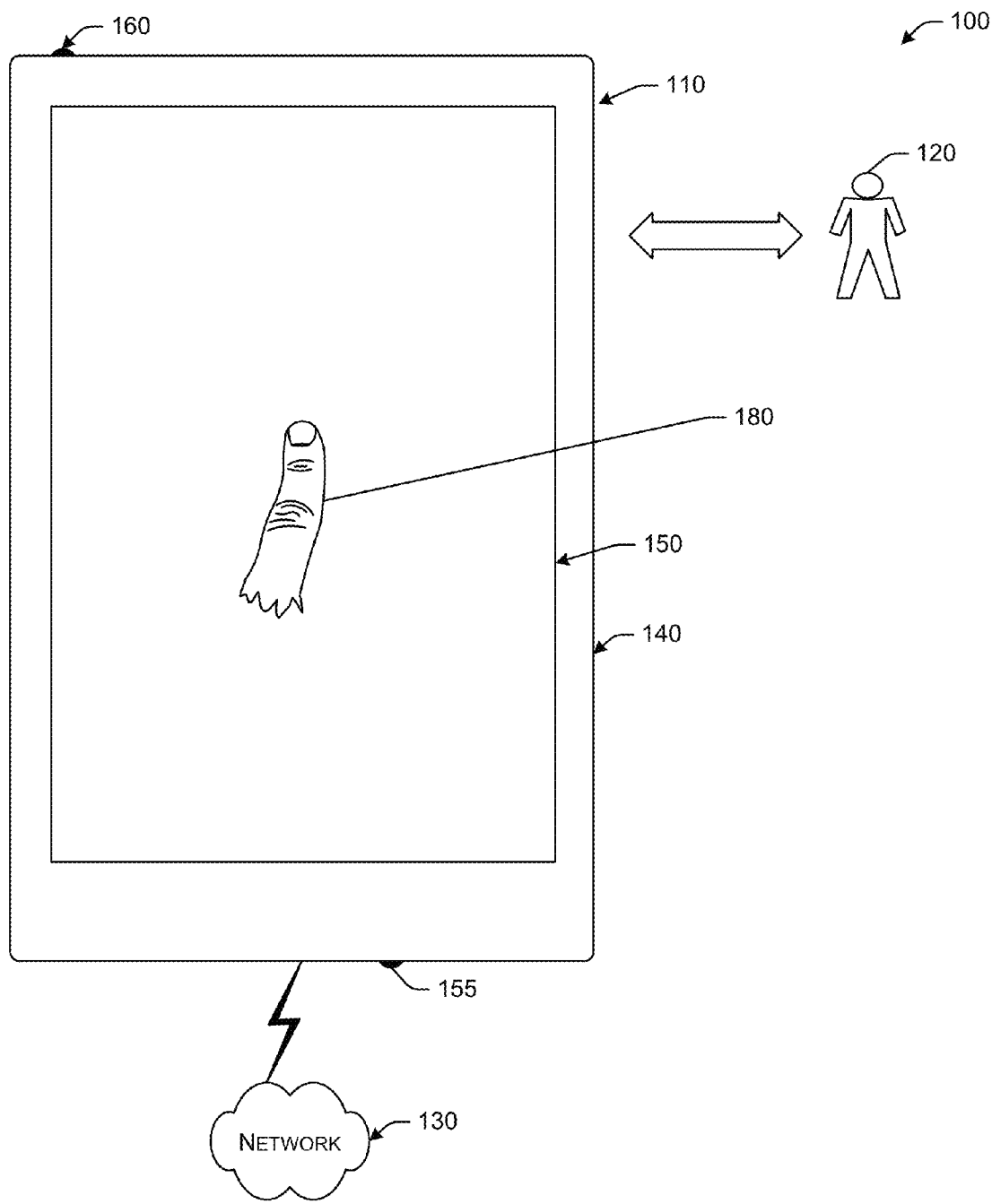
FIG. 1 is a schematic illustration of an example electronic device with a touch sensitive display that may be configured for paginated display and selection across pages, in accordance with embodiments of the disclosure.

Embodiments of the present disclosure are directed to, among other things, selecting text or other elements on an electronic device, such as an electronic book reader, and more particularly selecting text or other elements across more than one page with paginated displays.

User devices, such as electronic readers, tablet computers, laptop computers, smart phones, and the like, are often used by users to display various forms of media content, such as text and/or pictures. Often times, especially for electronic book readers, the electronic device may be configured to display the media in a paginated fashion, where the elements, such as text, are shown as multiple pages. In other words, text and/or other elements may be segmented into pages, and each page may be predetermined and may be displayed as one or more pages on the electronic displays of the user device. For example, the elements of the media may not be shown in a scrolling fashion, where the elements scroll onto and off of the display of the user device.

In certain embodiments of the disclosure, the electronic device may have a touch sensitive display where a user may touch the surface of the display to provide input to the electronic device. In one aspect, the touch sensitive display may be touched with the user's finger or with any suitable pointing element, such as a pen. The electronic device may be able to detect points on the touch sensitive surface where a user touches the touch sensitive surface. The electronic device may further be configured to detect the dragging of the pointing element and/or finger on the surface of the touch sensitive display. Responsive to detecting the dragging of the finger on the touch sensitive display, the electronic device may be configured to select elements between an initial position where the touch sensitive display was touched and the current position where the touch sensitive display was touched, which may span two or more pages.

In certain embodiments, the touch sensitive user display may have a first predetermined position. This first predetermined position, when touched by a user, may cause the electronic device to move to the next page and select at least a portion of the next page. In certain embodiments, the touch sensitive user display may have a second predetermined position. This second predetermined position, when touched by a user, may cause the electronic device to move to the previous page and select at least a portion of the previous page. The elements of the media content may be selected when the user touches the touch sensitive user display for a predetermined period of time.

In certain further embodiments of the disclosure, the user device may display a next or subsequent page of a media on the touch sensitive display upon detecting a touch at the first predetermined position for at least a first temporal period. Therefore, the user may be able to select text for elements across more than one page by touching an initial location on the touch sensitive user display and dragging his/her finger to the first predetermined position and continue to touch that first predetermined location for at least the first temporal period. The user may then drag his/her finger away from the first predetermined position, after the next page is displayed, before a second predetermined period has lapsed. The electronic device may detect this movement of the finger on the touch sensitive display and, responsive to the movement, may deselect portions of the current displayed page on the touch sensitive display. In effect, the user using the electronic device may select a selection that spans from the initial location where the user touched the touch sensitive display on the first page to a final touch location on the subsequent page. During this time when the user selects a selection, the user may not lift his/her finger from the touch sensitive display screen. In this multipage selection, the user, in effect, may touch the first predetermined position for a first predetermined temporal period to move from the first page to a subsequent page. In certain embodiments, the first predetermined location may be substantially at the bottom right corner of the touch sensitive display screen. In these or other embodiments, the first temporal period may be approximately one to three seconds long, such as one second, two seconds, or three seconds.

Similarly, the electronic device may be configured to make selections across multiple pages where the electronic device initially displays a first page and then was prompted to display a previous page for selecting content on prior pages. In these embodiments, the electronic device may be configured to select displayed elements on the touch sensitive display screen when a user touches a particular location on the touch sensitive display screen and subsequently drags his/her finger away from the particular initial touch location. The user may touch a second predetermined location upon the touch sensitive display screen and, responsive to detecting the touch for a predetermined temporal period at the second predetermined location, the electronic device may display the page previous to the page that is currently displayed on the touch sensitive display screen. When the electronic device changes the display on the touch sensitive display screen responsive to user input, one or more elements of the newly displayed page may be selected as a part of a selection. The user may further move his/her finger on the touch sensitive display screen to select additional elements or to deselect already selected elements. In certain embodiments, the second predetermined location may be at approximately the top left corner of the touch sensitive display screen.

In further embodiments, elements may be selected across more than two display pages. In the case of selecting elements in a forward direction, a user may touch the first predetermined location on the touch sensitive display screen for a predetermined temporal period after a selection has already been made across two or more display pages. Responsive to detecting this touch of the first predetermined location for a second temporal period, the electronic device may display a subsequent page to the page that is currently being displayed. Similar to the case of selection across two pages, at this point, there may be elements selected on the newly displayed page. Therefore, the selection at this point may span three or more pages. In certain embodiments, the second temporal period may be longer than the first temporal period. The user may drag his/her finger across the touch sensitive display screen to select and/or deselect elements on the displayed page.

Similar to selecting elements across two or more pages in the forward direction, the electronic device may be configured to select items across two or more pages in the reverse direction. In these embodiments, the user may touch the second predetermined location on the touch sensitive display screen for a second temporal period after a selection has already been made across two or more display pages. Responsive to detecting the touch by the user on the touch sensitive display screen, the electronic device may continue to select elements on the display and further display the page previous to the current page. In effect, to change the display from the first displayed page to a previous page, the electronic device may detect the user's touch at the second predetermined location for a first temporal period. Subsequent to that initial change of display while selecting elements on the display, the electronic device may display a third page that is previous to the currently displayed page or, in other words, the page that is two pages prior to the initial page. When the electronic device displays the page that is two pages prior to the initial page, it may select elements on that page. The user may drag his/her finger to select and/or deselect elements on the currently displayed page.

In one aspect, the second temporal period may be longer than the first temporal period, so that the user does not accidentally select the prior or later pages unintentionally. In other words, the second temporal period may be provided with a temporal span such that a user may move his or her finger away from either the first predetermined location or the second predetermined location within the span of a second, if the user does not want to select either the prior or subsequent pages. In certain embodiments, the second temporal period may be approximately 1.5 seconds.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts a schematic illustration of an example electronic device with a touch sensitive display that may be configured for paginated display and selection across pages. The illustrative environment 100 depicts techniques for selecting elements on an electronic device 110 across multiple pages. The electronic device 110 may be configured to interact with a user 120. The electronic device 110 may further be configured to interact with other elements or other devices via one or more communicative links, such as a connection to the network 130. In one aspect, electronic device 110 may be configured to download and/or upload media files and/or other media data via the network 130. The electronic device 110 may include a chassis and/or casing 140. The electronic device 110 may further include one or more user input interfaces, such as a touch sensitive display screen 150. Further still, the electronic device 110 may include one or more switches and/or buttons 155 to enable user control of one or more functionalities of the electronic device 110. The electronic device 110 may further include one or more sensors 160.

The users 120 may be individuals or other entities, such as corporations, non-profit organizations, for-profit organizations, government organizations, public sector organizations, or any of the aforementioned entities located in this country or foreign countries. The electronic device 110 may be any one of suitable devices that may be configured to user 120 interaction and display of one or more media elements. The electronic device 110, in certain embodiments, may be a personal user device. For example, the electronic device 110 may include, but is not limited to, a personal computer, a desktop computer, a notebook computer, a laptop computer, a personal digital assistant, an electronic book (ebook) reader, a tablet computing device, a pad computing device, a smart phone, or combinations thereof. While the drawings and/or specification may portray the electronic device in the likeness of an ebook reader and/or tablet computing device, the disclosure is not limited to these devices. Indeed, the systems and methods described herein may apply to any electronic device capable of displaying media elements, such as text, images, and/or sound. The casing 140 of the electronic device 110 may be constructed of any suitable material, such as plastics, metals, ceramics, or combinations thereof. In certain embodiments, the casing 140 may be constructed of thermal plastic materials using injection molding methods.

The one or more sensors 160 may be in the form of input and/or output interfaces, such as microphones, image sensors, accelerometers, gyroscopes, or the like. Microphones may be of any known type including, but not limited to, condenser microphones, dynamic microphones, capacitance diaphragm microphones, piezoelectric microphones, optical pickup microphones, or combinations thereof. Furthermore, the microphones may be of any directionality and sensitivity. For example, the microphones may be omni-directional, uni-directional, cardioid, or bi-directional. Image sensors may be any known device that converts an optical image to an electronic signal. The image sensor may be of any known variety including a charge coupled device (CCD), complementary metal oxide semiconductor (CMOS) sensors, or the like. The image sensor may further be of any pixel count and aspect ratio. The one or more buttons 155 may be actuated by the user to turn on or turn off the electronic device 110.

The touch sensitive display screen 150 may be any suitable touch sensitive display including, but not limited, to a capacitive panel. The capacitive panel may have a plurality of capacitive cells (not shown) of any shape and size that can have a varying charge associated therewith. The charge on each cell may vary based on the proximity of a pointing device, such as a finger 180, near one or more of the cells and the variation in charge may be interpreted by the electronic device 110 as an indication of touching the touch sensitive display screen 150. In other words, a conductive element, such as the finger 180, may be able to perturb the charge on one or more capacitive cells of the capacitive panel when proximate to those cells. Therefore, the capacitive panel signal can indicate the region on the touch sensitive display screen 150 where an object, such as the finger 180, is near or touching. The functioning of capacitive panels is well-known, and in the interest of brevity, will not be reviewed here.

Figure 2:
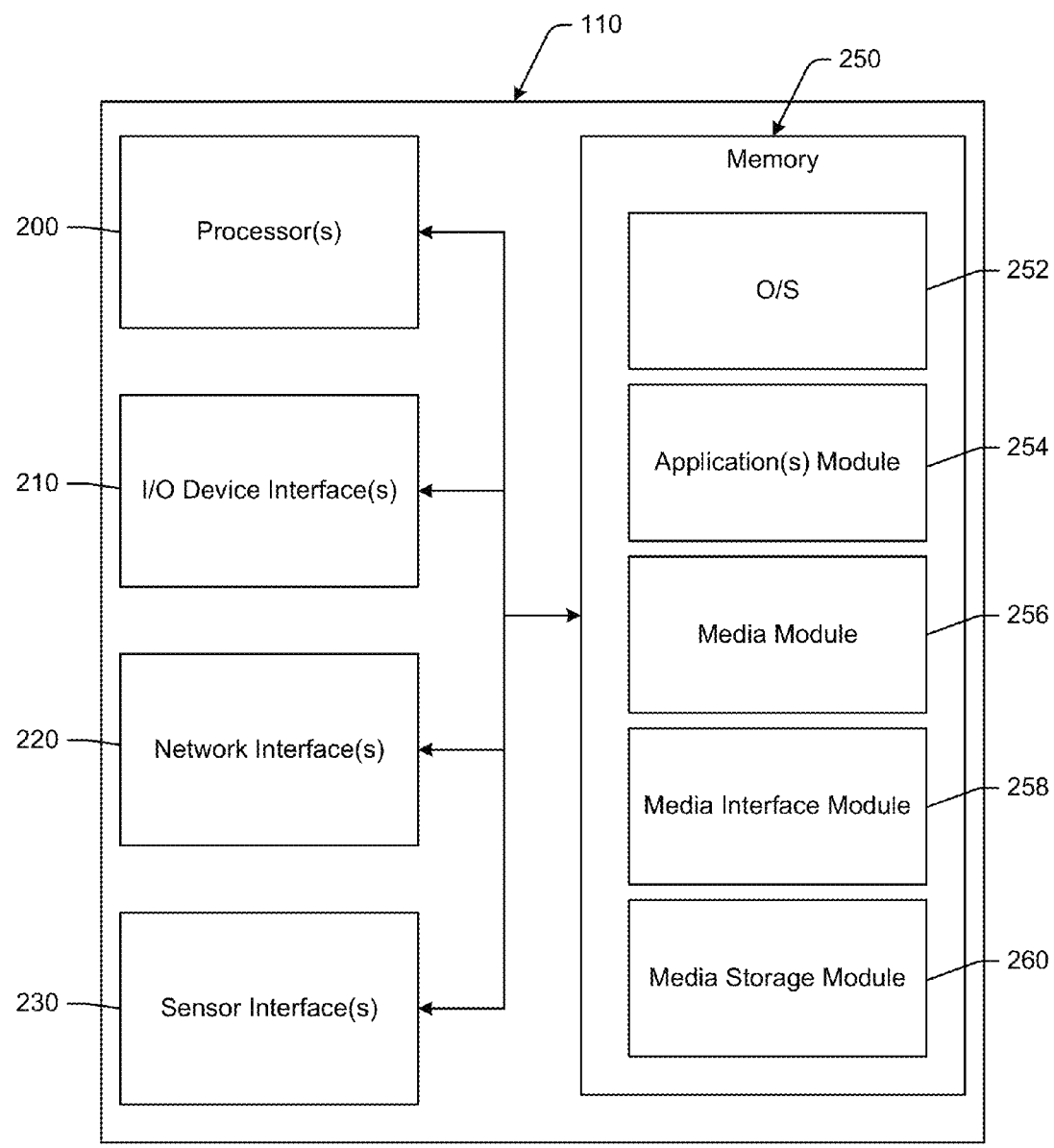
FIG. 2 illustrates a block diagram of the example electronic device of FIG. 1, in accordance with embodiments of the disclosure.

The networks 130 may include any one or a combination of different types of suitable communications networks, such as cable networks, the Internet, wireless networks, cellular networks, and other private and/or public networks. Furthermore the networks 130 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 120 accessing a website and/or web service over the networks 130, the described techniques may equally apply in instances where the users 120 interact with the website servers via one or more user devices over a landline phone, via a kiosk, or in any other manner. FIG. 2 illustrates a block diagram of an example electronic device. Referring now to FIG. 2, the electronic device 110 may include one or more processors 200, one or more input/output (I/O) device interfaces 210, one or more network interface(s) 220, one or more sensor interface(s) 230, and/or one or more memories 250. In some examples, the processors 200 of the electronic device 110 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The electronic device 110 may also include a chipset (not shown) for controlling communications between the one or more processors 200 and one or more of the other components of the electronic device 110. The one or more processors 200 may also include one or more application-specific integrated circuits (ASICs) or application-specific standard products (ASSPs) for handling specific data processing functions or tasks.

The I/O device(s) or user interface(s), such as the touch sensitive display screen 150, may be controlled via the one or more I/O device interfaces 210. The network interfaces(s) 220 may allow the electronic device 110 to communicate via network 130 and/or via other communicative channels. For example, the electronic device 110 may be configured to communicate with stored databases, other computing devices or servers, user terminals, other devices on the networks 130 and/or repositories of media content. The sensor interface(s) 230 may enable the electronic device 110 to receive and interpret signals from the one or more sensors 160.

The memory 250 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 250 may store program instructions that are loadable and executable on the processor(s) 200, as well as data generated or received during the execution of these programs. Turning to the contents of the memory 250 in more detail, the memory 250 may include an operating system (O/S) module 252, an applications module 254, a media module 256, a media interface 258, and/or a media storage module 260. Each of the modules and/or software may provide functionality for the electronic device 110, when executed by the processors 200. The modules and/or the software may or may not correspond to physical locations and/or addresses in the memory 250. In other words, the contents of each of the modules may not be segregated from each other and may, in fact, be stored in at least partially interleaved positions on the memory 250.

The operating system module 252 may have one or more operating systems stored thereon. The processors 200 may be configured to access and execute one or more operating systems stored in the operating system module 252 to operate the system functions of the electronic device 110. System functions, as managed by the operating system module 252, may include memory management, processor resource management, driver management, application software management, system configuration, and the like. The operating system module 252 may be any variety of suitable operating systems including, but not limited to, Google® Android®, Microsoft® Windows®, Microsoft® Windows® Server®, Linux, Apple® OS-X®, or the like. The application module 254 may contain instructions and/or applications thereon that may be executed by the processors 200 to provide one or more services to the user 120. These instructions and/or applications may, in certain aspects, interact with the operating system module 252 and/or other modules of the electronic device 110.

The media module 256 may have stored thereon instructions and/or programs that when executed by the processors 200 may enable the electronic device 110 to access and manage media that may be rendered by the electronic device 110 to the user 120. In one aspect, the media module 256 and the instructions stored thereon may enable the processors 200 to receive and/or retrieve media from a variety of suitable sources. The sources may include, for example, one or more servers, websites, online bookstores, and/or general distributors of electronic media. For example, the media may be downloaded from a social networking website or from the website of electronic media retailers. In certain aspects, the processors 200, while running instructions and/or applications stored in the media module 256, may be configured to invoke the network interfaces 220 to communicate via the network 130 and/or any other suitable communicative channel to access any variety of suitable sources of electronic media.

Instructions and/or applications stored in the media module 256 may further be executed by the processors 200 and thereby enabling the processors 200 to receive electronic media from a source of electronic media, such as via the network 130. The electronic media may be received in the form of one or more data packets that may be processed using the instructions and/or applications stored in the media module 256. The one or more data packets may further include extension information, such as parity check bit(s), CRC bit(s) or other transmission quality check information. Upon receiving the electronic media, the instructions and/or applications stored in the media module 256 may be executed by the processors 200 to render the electronic media on one or more user interfaces of the electronic device 110, such as the touch sensitive display screen 150. In one aspect, the electronic media may be rendered as text, images, and/or sound. In certain embodiments, the instructions and/or applications of the media module 256 may enable the processors 200 to display the particular page of electronic media, such as on the touch sensitive display screen 150. The processors 200 may further be configured to display subsequent and/or prior pages of the electronic media based upon inputs received from the user 120. Therefore, the processors 200 may be configured to modify the rendering, such as the display of electronic media, based on an indication of one or more inputs from the user 120.

The media interface module 258 may have stored thereon instructions and/or programs that when executed by the processors 200 may enable the electronic device 110 to allow the user 120 to interact with the rendered media. In certain embodiments, the processors 200 may be configured to receive input from the user 120 via the touch sensitive display screen 150 by executing the instructions and/or applications stored in the media interface module 258. Indeed, the processors 200 may be configured to interact with the I/O device interfaces 210 and/or the sensor interfaces 230 to receive input from the touch sensitive display screen 150 and/or the one or more sensors 160. In certain embodiments, the processors 200 may receive an indication of the user 120 touching, such as using finger 180, one or more spots on the touch sensitive display screen 150. Indeed, the instructions and/or applications stored in the media interface module 258 may interact with the instructions and/or applications stored in the media module 256 to accept user 120 input and modify the rendering of the electronic media based thereon.

In certain embodiments, the instructions and/or applications stored on the media interface module 258 may be executed by the processors 200 to enable the processors 200 to identify particular locations on the touch sensitive display screen 150 that are touched by the finger 180 or other pointing device. The processors 200 may be able to identify whether one or more predefined locations on the touch sensitive display screen 150 is being and/or has been touched by the user 120, such as by using finger 180. The processors 200 may further be able to identify the amount of time that the user 120 has touched one or more particular predefined locations on the touch sensitive display screen 150. For example, the processors 200 may be able to detect if the user 120 has touched the bottom right corner of the touch sensitive display screen 150 for a predefined time span. As another example, the processors 200 may be able to detect if the user 120 has touched the top left corner of the touch sensitive display screen 150 for a second predefined time span. These user interactions with the touch sensitive display screen 150 may be used by the processors 200 to modify elements, such as text or images, that are displayed on the touch sensitive display screen 150 at any point in time.

The media storage module 260 may have stored thereon instructions and/or programs that when executed by the processors 200 may enable the electronic device 110 to store and manage the electronic media that may be available on the electronic device 110. In certain embodiments, when the media module 256 and the instructions and/or applications stored thereon receive one or more electronic media files, the received one or more electronic media files may be stored in memory 250 by the processors 200 by executing instructions and/or applications of the media storage module 260.

It will be appreciated that there may be an overlap in the functionality of the instructions stored in the media module 256, the media interface module 258, and the media storage module 260. In fact, the functions of the three modules 256, 258, and 260 may interact and cooperate seamlessly under the framework of the electronic device 110. Indeed, each of the functions described for any of the modules 256, 258, and 260 may be stored in any module 256, 258, and 260 in accordance with certain embodiments of the disclosure. Further, in certain embodiments, there may be one single module that includes the instructions, programs, and/or applications described within the media module 256, the media interface module 258, and the media storage module 260.

The memory 250, any databases, and/or any other memory modules, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Illustrative Processes

The electronic device 110 may be accessed by user 120 to view media content on the touch sensitive display screen 150. In one aspect, the user may use his/her finger 180 to control the display of the media on the touch sensitive display screen 150. In embodiments of the disclosure, the user may interact with the electronic device 110 to select elements that are displayed on the electronic device 110. In certain embodiments, the electronic device 110 may be configured to make selections of displayed elements across more than one page of media that may be displayed by the electronic device 110.

Figure 3:
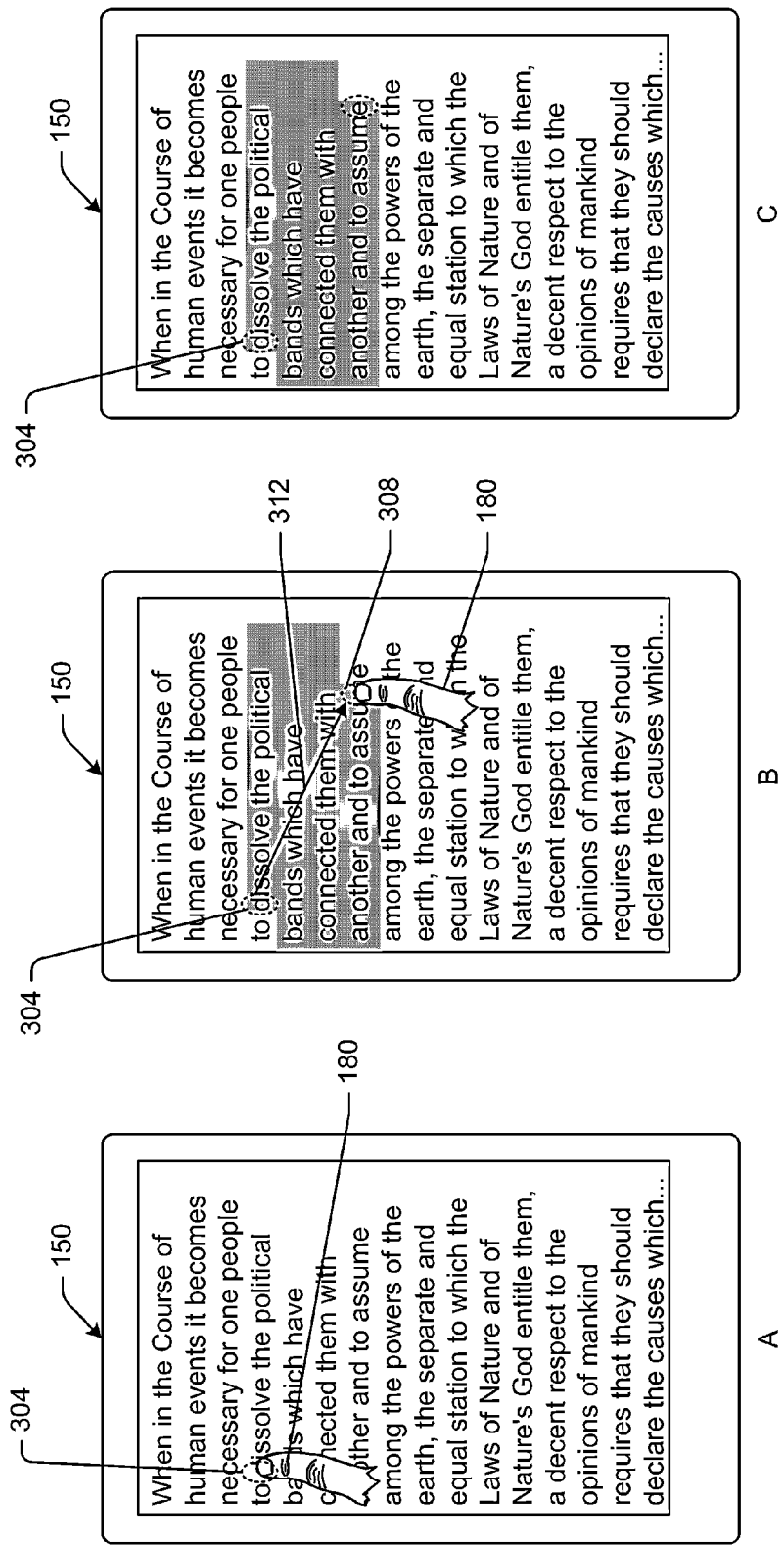
FIGS. 3A, 3B, and 3C illustrate an example mechanism for making selections on the touch sensitive display of the electronic device of FIG. 1, in accordance with embodiments of the disclosure.

FIGS. 3A, 3B, and 3C illustrate an example mechanism for selecting displayed elements on the touch sensitive display of the electronic device 110 in accordance with embodiments of the disclosure. The elements, such as the displayed text, may be in a paginated view. In other words, the display rendered on the touch sensitive display screen 150 may transition from one page to the next and/or previous page, instead of scrolling up and/or down to display other elements of the media content being rendered by the electronic device 110. Although, the elements displayed on the touch sensitive display screen 150 are shown as text, it will be appreciated that the elements may include any suitable element, such as text, pictures, sounds, or combinations thereof.

In one aspect, a user may place his/her finger 180 on a first location 304 on the touch sensitive display screen 150 and he/she may drag his/her finger 180 from the first location 304 to a second location 308, by moving the finger 180 in the direction indicated by arrow 312. In certain embodiments, dragging the finger 180 on the touch sensitive display screen 150 may entail not lifting the finger 180 from the surface of the touch sensitive display screen 150 while moving the finger in the direction indicated by the arrow 312. When the finger 180 is lifted from the surface of the touch sensitive display screen 150, the elements, such as text, between the first location 304 and the second location 308 may be selected. In other words, the selection of items on the displayed page may entail the electronic device 110, and the processors 200 thereon, detecting the motion of the user's 120 finger 180 from an initial selection position to a final selection position on the touch sensitive display screen 150. In certain embodiments, the selection may be highlighted or otherwise emphasized relative to the non-selected text on the page. The selected text in FIGS. 3B and 3C is shown as highlighted between the first location 304 and the second location 308.

In certain embodiments, the electronic device 110 and the processors 200 thereon may select elements on the screen when an initial time for touching the first location 304 is detected and determined to exceed a predetermined threshold. In other words, the electronic device 110 may commence selecting elements on the display of the touch sensitive display screen 150 when the electronic device 110 detects that the first location has been touched for a predetermined span of time. The predetermined span of time may be, for example, approximately 1 second.

Figure 4A:
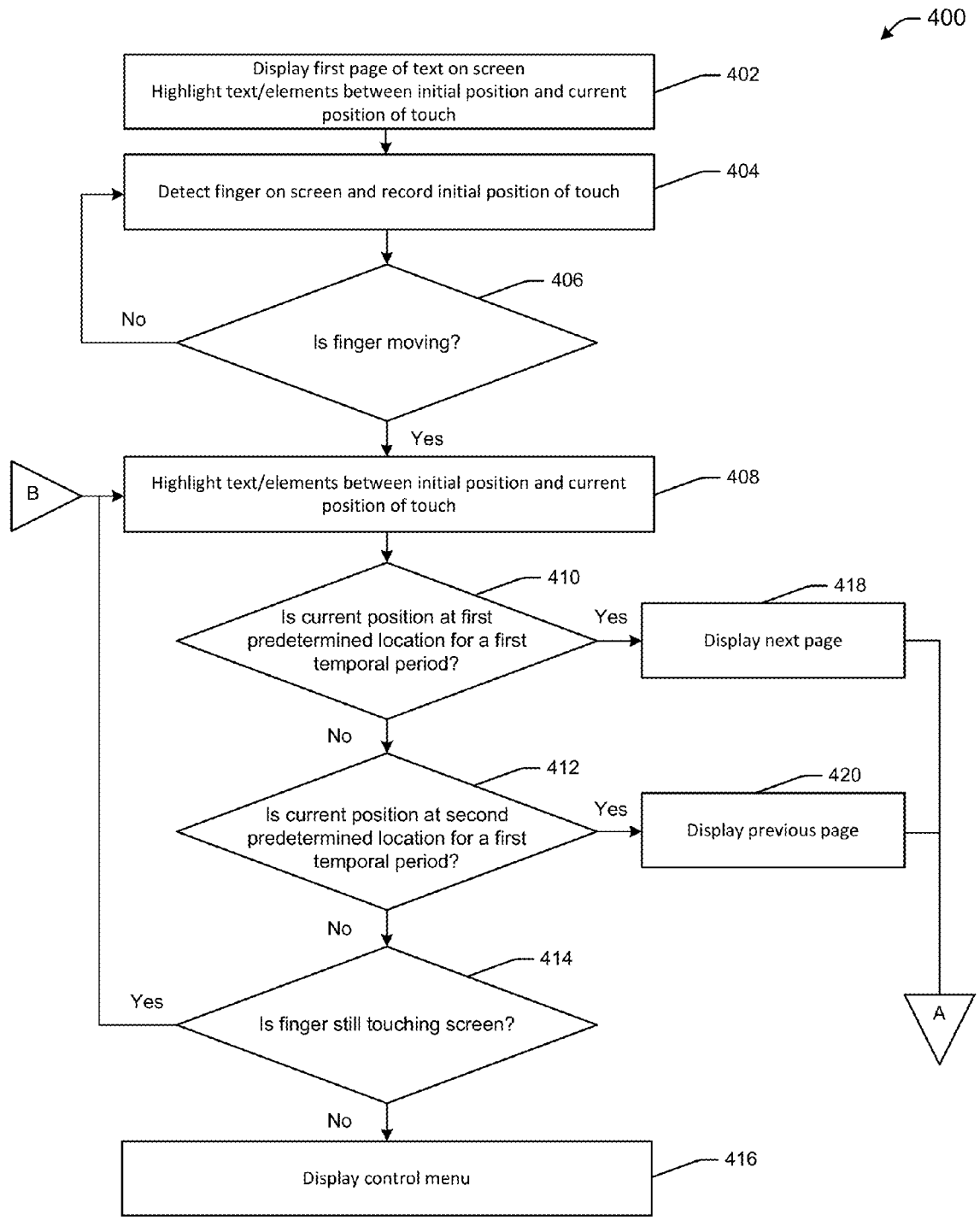
FIGS. 4A and 4B illustrate a flow diagram representing an example method for selecting elements across pages on the example electronic device of FIG. 1, in accordance with embodiments of the disclosure.
Figure 4B:
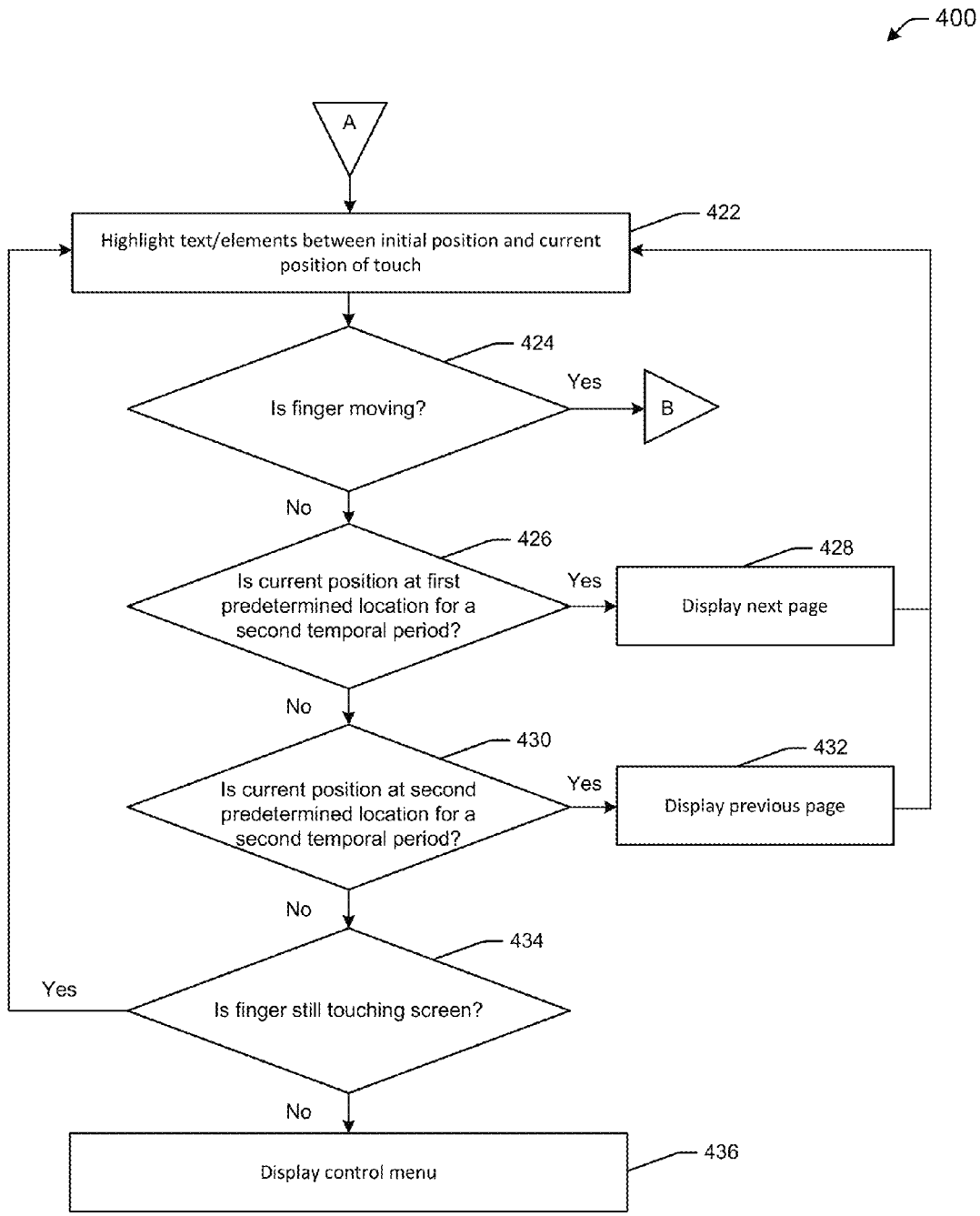

It will be appreciated that the elements selected, as shown in FIGS. 3A, 3B, and 3C, are on a single displayed page as rendered by the electronic device 110 on the touch sensitive display screen 150. The electronic device 110, however, may be configured to enable selection of elements as a single selection across more than one page rendered by the electronic device 110. Referring now to FIGS. 4A and 4B, a flow diagram depicting an example method 400 for selecting elements across more than one page of media content is shown. The method 400 may be performed by the electronic device 110, in accordance embodiments of the disclosure.

At block 402, a first page of text may be displayed on the touch sensitive display screen 150. In one aspect, the display on the touch sensitive display screen 150 may include any suitable element(s) such as text, images, or a combination of text and images. As discussed above, the electronic device 110 and the processors 200 may be configured to receive media files and/or media content from one or more sources, such as a remote media content server via the network 130. In one aspect, the processors 200 may execute code and/or applications stored in the media module 256 to request and/or receive media content and/or files. In one aspect, the media content and/or files may be received as a stream of data and/or as one or more data packets. The processors 200 may be configured to receive the media data packets and/or streaming data and render the associated media content on the touch sensitive display screen 150 and/or other elements of the electronic device 110. In certain embodiments, the media content and/or files may be saved on the memory 250 of the electronic device 110. To do so may involve executing by the processors 200, code available in the media storage module 260 of the memory 250. In these embodiments, the media content may be stored in the memory 250 and may be rendered on the touch sensitive display screen 150 of the electronic device 110 by the processors 200 accessing the media content from the memory 250.

At block 404, the finger on the screen may be detected, and an initial position of touch may be recorded. The recorded location on the touch sensitive display screen 150 may in certain embodiments be stored or saved on the memory or one or more registers of the processors 200. In certain embodiments, the initial location of the touch may be stored as a coordinate, such as a two-dimensional coordinate that may indicate the location of the initial touch by the finger 180 on the touch sensitive display screen 150. In certain embodiments, the electronic device 110 and the processors 200 thereon may detect and/or measure the length of time that the initial location has been touched. The electronic device 110 and the processors 200 thereon may further determine that the length of time that the initial location on the touch sensitive display screen 150 has been touched exceeds a predetermined threshold time span. In these embodiments, the electronic device 110 may commence selecting elements on the display of the touch sensitive display screen 150 when the electronic device 110 detects that the initial location has been touched for a predetermined span of time. The predetermined span of time may be, for example, approximately 1 second. In the same or other embodiments, the electronic device 110 and the processors 200 thereon may begin selecting of items on the display of the touch sensitive display screen 150 if other touch based actions are not detected. For example, if the touch by the finger 180 on the touch sensitive display screen 150 does not indicate an action for the electronic device 110 to perform, such as "flipping" the displayed page or changing the displayed media content, then the electronic device 110 and the processors 200 may interpret the touch to be an indication of the user's desire to select elements on the touch sensitive display screen 150.

At block 406, it may be determined if the finger is moving. If at block 406, it is determined that the finger is not moving, then the method 400 may return to block 404 to continue detecting the finger 180 and the position of the finger 180. In the context of determining if the finger 180 is moving, it should be noted that, in many cases, the threshold of detecting the motion of the finger 180 may exceed the ability of a human to control the motion of his/her finger 180. In other words, the finger 180 may have some positional jitter associated therewith that may not be readily controllable by the user 120, but may be detected by the electronic device 110. Accordingly, the electronic device 110 may ascertain that the finger 180 is in motion if the movement of the finger 180 exceeds a predetermined spatial threshold. This predetermined spatial threshold may be related to a human's ability to control the motion of his/her finger on the surface of the touch sensitive display screen 150.

At block 406, if it is determined that the finger 180 is moving, then the method 400 may proceed to block 408, where the text and/or elements on the display between the initial position and the current position may be highlighted. Therefore, the processors 200 may detect the current position of the finger 180 on the touch sensitive display screen 150 and may determine elements to select and/or highlight based at least in part on the initial location and the currently detected location of the finger 180.

At block 410, it may be determined if the current position is at a first predetermined location for a first temporal time period. If at block 410, the current location of the finger 180 is determined to not be at a first predetermined location or not at the first predetermined location for at least a first temporal period, then the method 400 may proceed to block 412 to determine if the current position is at a second predetermined location for the first temporal time period. If at block 412, the current location of the finger 180 is determined to not be at the second predetermined location or not at the second predetermined location for at least a first temporal period, then the method 400 may proceed to block 414 to determine if the finger is still touching the screen. If it is determined that the finger 180 is still touching the screen at block 414, then the method 400 may return to block 408 and continue to display highlighted text between the initial position and the current position of touch, corresponding to selected elements on the display of the touch sensitive display screen 150. If at block 414, it is determined that the finger 180 is no longer touching the surface of the touch sensitive display screen 150, then the method 400 may proceed to block 416, where a control menu may be displayed. In one aspect, the control menu may be displayed on and/or near the selected and highlighted displayed elements. The control menu may offer the user one or more choices of actions that the user may perform. In certain embodiments, the actions offered by the displayed control menu may include actions that may be performed on the selected elements, such as copying the selected elements to a buffer or a clipboard. It should be noted that the control menu displayed on the touch sensitive display screen 150 at block 416 may be displayed with a selection of elements that do not span more than one page of the media content rendered by the electronic device 110.

If at block 410, it is determined that the current position is at the first predetermined location for a first temporal period, then at block 418, the next page may be displayed. In other words, if the electronic device 110 and the processors 200 thereon detect the touching of a particular location on the touch sensitive display screen 150, then the electronic device 110 may change the display to display the subsequent page of the media content on the touch sensitive display screen 150. Of course, if the last page of the media content is displayed at the point when it is determined that the user has touched the first predetermined location for a first temporal period, then the display may not proceed to a subsequent page and, instead, may remain on the last page of the media content.

It will be appreciated that at block 418, when the display proceeds to the subsequent page of the media content, some or all of the elements, such as text, on the subsequent page, when displayed, may be selected as part of the selection. To deselect elements of the subsequent page, the user 120 may move his/her finger away from the first predetermined location as is described in more detail below. In certain embodiments, the first predetermined location may be at approximately the bottom right corner of the touch sensitive display screen 150. In these embodiments, the user 120 may, therefore, place his/her finger 180 at approximately the bottom right corner of the touch sensitive display screen 150, and responsive to detecting the touch of the finger 180 at this location for the first predetermined temporal period, may display the next page and select all of the elements on the subsequent page of the touch sensitive display screen 150.

If at block 412, it is determined that the current position is at the second predetermined location for a first temporal period, then at block 420, the prior page may be displayed. In other words, if the electronic device 110 and the processors 200 thereon detect the touching of a particular location on the touch sensitive display screen 150, then the electronic device 110 may change the display to display the prior page of the media content on the touch sensitive display screen 150. Of course, if the first page of the media content is displayed at the point when it is determined that the user has touched the second predetermined location for a first temporal period, then the display may not proceed to the prior page and, instead, may remain on the first page of the media content.

It will be appreciated that at block 420, when the display proceeds to the prior page of the media content, some or all of the elements, such as text, on the previous page, when displayed, may be selected as part of the selection. To deselect elements of the previous page, the user 120 may move his/her finger away from the second predetermined location as is described in more detail below. In certain embodiments, the second predetermined location may be at approximately the top left corner of the touch sensitive display screen 150. In these embodiments, the user 120 may, therefore, place his/her finger 180 at approximately the top left corner of the touch sensitive display screen 150, and responsive to detecting the touch of the finger 180 at this location for the first predetermined temporal period, may display the previous page and select all of the elements on the previous page of the touch sensitive display screen 150.

From either of blocks 418 or 420, the method 400 may proceed to block 422 of FIG. 4B, where text and/or other elements between the initial touch position and the current touch position may be highlighted or otherwise emphasized to indicate their inclusion within the selection. For example, if the finger 180 is at approximately the top left corner of the touch sensitive display screen 150 and block 422 is reached via block 420, then in certain embodiments, the current selection may include some or all elements on an initial page, as well as all of the elements on the previous page, or the page prior to the initial page of display. As another example, if the finger 180 is at approximately the bottom right corner of the touch sensitive display screen 150 and block 422 is reached via block 418, then in certain embodiments, the current selection may include some or all of the elements on an initial page, as well as all of the elements on the subsequent page, or the page after the initial page of display.

At block 424, it may be determined if the finger is moving. If the finger is moving, then the method 400 may return to block 408 to highlight or otherwise emphasize text and/or other elements between the initial touch position and the current touch position. It should be noted that at this point the selected elements span more than one page of display. Indeed the selected portions displayed at block 408 are the portions of the selection that are visible on the display, or the selected elements on the currently displayed page on the touch sensitive display screen 150.

If at block 424, it is determined that the finger is not moving, then at block 426, it may be determined if the current position is at the first predetermined position for a second temporal period. In certain embodiments, the second temporal period may be different from the first temporal period. In the same or different embodiments, the second temporal period may be longer in time than the first temporal period. For example, the first temporal period may be approximately 1 second long and the second temporal period may be 1.5 seconds long. In other embodiments, the first and second temporal periods may be substantially the same span of time.

If at block 426 it is determined that the current position of the finger 180 is at the first predetermined location for a second temporal period, then the touch sensitive display screen 150 may display the next page at block 428. Of course, if the last page of the media content is displayed at the point when it is determined that the user 120 has touched the first predetermined location for a second temporal period, then the display may not proceed to a subsequent page and, instead, may remain on the last page of the media content. When the next and/or subsequent page is displayed, portions or all of the elements on the newly displayed page may be selected and/or highlighted as part of selected elements. The method 400 may proceed to block 422, where text and/or other elements between the initial touch position and the current touch position may be highlighted or otherwise emphasized to indicate their inclusion within the selection. Indeed, only the portion of the selected elements that are currently shown on the touch sensitive display screen 150 may be shown as selected and highlighted and/or emphasized in other ways. Therefore, there may be selected elements on one or more other pages of the media content that are not currently displayed and therefore are not currently displayed as highlighted.

If at block 426 it is determined that the current position of the finger 180 is not either at the first predetermined location or not at the first predetermined location for a second temporal period, then at block 430, it may be determined if the current position of the finger is at the second predetermined location for the second temporal period. If it is determined that the current position of the finger 180 is at the second predetermined location for a second temporal period, then the touch sensitive display screen 150 may display the previous page at block 432. Of course, if the first page of the media content is displayed at the point when it is determined that the user 120 has touched the second predetermined location for a second temporal period, then the display may not proceed to a previous page and, instead, may remain on the first page of the media content. When the previous and/or prior page is displayed, portions or all of the elements on the newly displayed page may be selected and/or highlighted as part of the selected elements. The method 400 may proceed to block 422, where text and/or other elements between the initial touch position and the current touch position may be highlighted or otherwise emphasized to indicate their inclusion within the selection. Indeed, only the portion of the selected elements that are currently shown on the touch sensitive display screen 150 may be shown as selected and highlighted and/or emphasized in other ways. Therefore, there may be selected elements on one or more other pages of the media content that are not currently displayed and therefore are not currently displayed as highlighted.

If at block 430, it is determined that the current position of the finger 180 is neither at the second predetermined location nor at the second predetermined location for a second temporal period, then at block 434, it may be determined if the finger is still touching the touch sensitive display screen 150. If the finger is still touching the touch sensitive display screen, then the method 400 may return to block 422, where text and/or other elements between the initial touch position and the current touch position may continue to be highlighted or otherwise emphasized to indicate their inclusion within the selection. Indeed, only the portion of the selected elements that are currently shown on the touch sensitive display screen 150 may be shown as selected and highlighted and/or emphasized in other ways. Therefore, there may be selected elements on one or more other pages of the media content that are not currently displayed and therefore are not currently displayed as highlighted.

If at block 434, it is determined that the finger 180 is no longer touching the surface of the touch sensitive display screen 150, then at block 436, a control menu may be displayed. In one aspect, the control menu may be displayed on and/or near the selected and highlighted displayed elements. The control menu may offer the user one or more choices of actions that the user may perform. In certain embodiments, the actions offered by the displayed control menu may include actions that may be performed on the selected elements, such as copying the selected elements to a buffer or a clipboard. It should be noted that the control menu displayed on the touch sensitive display screen 150 at block 436 may be displayed with a selection of elements that span more than one page of the media content rendered by the electronic device 110.

It will be appreciated that the user 120, in certain embodiments, may choose to make a selection of elements across more than two pages, and the method 400 enables the selection of elements across any number of pages. The user 120 may touch an initial page at an initial location to start selecting elements on the first displayed page in accordance with the processes described in conjunction with blocks 406 and 408. The user 120 may next wish to select elements as part of the current selection on either a subsequent or prior page. In this case, the processes of either blocks 410, 418, and 422 or blocks 412, 420, and 422 may be invoked to make a selection on a subsequent or prior page, respectively. At this point, if the user 120 wishes to make a selection on a further subsequent page, the user 120 may invoke the processes of blocks 426, 428, and 422 to continue to make selections on yet a third page. Indeed, if the user 120 holds his/her finger 180 at the first predetermined position for several second temporal periods, then several pages may be selected in the forward direction and of the media content, such as a fourth page, fifth page, and/or so forth. Alternatively, the user 120 may move his/her finger away from the first predetermined location at block 424 and without lifting his/her finger 180 from the touch sensitive display screen 150, may move his/her finger back to the first predetermined location, and thereby invoke the processes of blocks 410, 418, and 422 a second or more times to display a subsequent page. It will be appreciated that the method 400 may proceed via any combination of blocks 410, 418, and 422 and/or blocks 426, 428, and 422 to select elements in a forward direction, or otherwise on one or more subsequent pages of the media content. Similarly, it will be appreciated that the method 400 may proceed via any combination of blocks 412, 420, and 422 and/or blocks 430, 432, and 422 to select elements in a reverse direction, or otherwise on one or more previous pages of the media content.

It should further be noted that in blocks 418, 420, 428, and 432 the display on the touch sensitive display screen 150 may change based at least in part on the detection of the finger 180 on the surface of the touch sensitive display screen 150 at a predetermined location for a predetermined time. The predetermined locations may be, as stated above, at the top left and the bottom right corners of the touch sensitive display screen 150. This location of the first and second predetermined locations may be particularly intuitive to users 120 for most Indo-European languages, where text is typically read in a left to right and top to bottom direction. However, in certain other embodiments, the first and second locations may be at other points on the surface of the touch sensitive display screen 150 based on one or more of the language, display style, and/or textual direction. For example, some text may be read in a top to bottom direction. In these cases, the first predetermined location may be at approximately the bottom center of the touch sensitive display screen 150, and the second position may be at approximately the top center of the touch sensitive display screen 150. In certain embodiments, the electronic device 110 and the processors 200 thereon may determine based at least in part on the language and/or the layout of text or other elements in the media content, the points of the first and/or second predetermined locations on the touch sensitive display screen 150.

The language and/or layout of the text may, in some cases, may be ascertained by the electronic device 110 and the processors 200 thereon from metadata associated with the media content and/or media files displayed on the electronic device 110. Therefore, the processors 200, in certain embodiments, may be configured to receive metadata associated with the media content and parse this metadata to determine the points of the first and second predetermined locations on the touch sensitive display screen 150. The metadata may be in the form of one or more data packets that may be received by the processors 200 via the network 130 or other communications channels. In certain embodiments, the metadata may be received by the processors 200 concurrently and/or as part of the media content and/or files. In other embodiments, the metadata may be received asynchronously from the media content, such as at a time after receiving the media content, such as from a separate server and/or website. Alternatively, the processors 200 may receive media files with metadata associated with the location of the first and second predetermined locations and may not need to make a determination of the position on the touch sensitive display screen 150 of the first and second predetermined locations. Instead, the positions of the predetermined locations may be ascertained directly from received metadata associated with the displayed media content.

It will be appreciated that in blocks 418, 420, 428, and 432, the display on the touch sensitive display screen 150 may change based at least in part on detecting the location of the finger 180 at a predetermined location for a predetermined span of time. Indeed, the first time the finger 180 is detected at either a first or a second predetermined location, the electronic device 110 may wait for a first predetermined span of time before the display is modified. If the user 120 keeps his/her finger 180 at that location for the second temporal period, then the display and/or selections may be modified again. It will be appreciated that in certain embodiments, the second temporal period may be longer than the first temporal period to prevent accidental selection and/or display of a previous and/or subsequent page by the user 120. Once a first page is "flipped," either forward or backward, the finger 180 remains at or is otherwise still touching the predetermined location associated with the "flip." Indeed, to prevent a subsequent flip, the user has to move his/her finger 180 away from the predetermined location. To allow the user to look at the display, think about the selections he/she wishes to make, and potentially move his/her finger away from the predetermined location on the touch sensitive display screen 150, additional time, relative to the first temporal period, may be allotted to the second temporal period.

It should be noted, that the method 400 may be modified in various ways in accordance with certain embodiments of the disclosure. For example, one or more operations of the method 400 may be eliminated or executed out of order in other embodiments of the disclosure. For example, the order of blocks 410 and 412 may be reversed in accordance with certain embodiments of the disclosure. Similarly, the order of blocks 426 and 430 may be reversed in accordance with certain embodiments of the disclosure. Additionally, other operations may be added to the method 400 in accordance with other embodiments of the disclosure.

Figure 5:
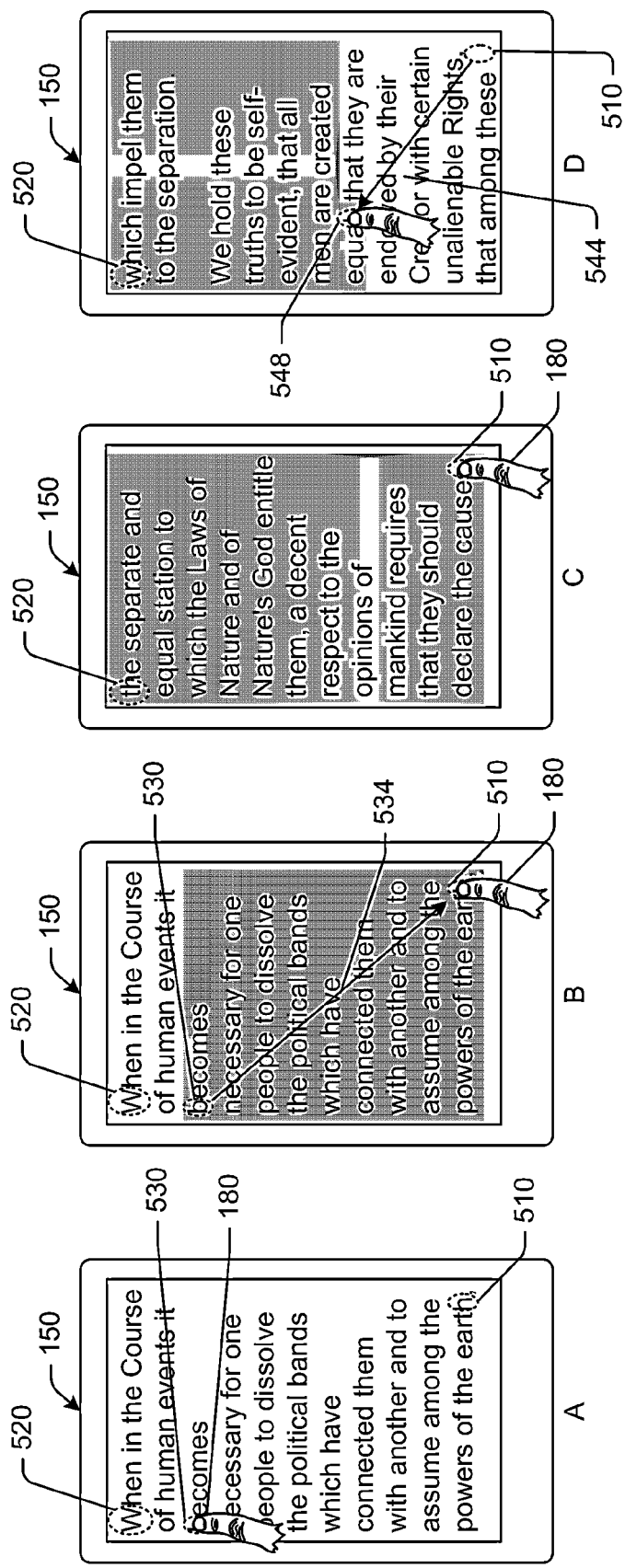
FIGS. 5A, 5B, 5C, and 5D illustrate an example mechanism for selecting text across more than one page in a forward direction, in accordance with embodiments of the disclosure.

Referring now to FIGS. 5A, 5B, 5C, and 5D, an example mechanism is discussed for selecting text across more than one page in a forward direction on the electronic device 110 in accordance with embodiments of the disclosure. In particular, FIG. 5A illustrates an example first page on the touch sensitive display screen 150. FIG. 5B illustrates the same example page as FIG. 5A, with portions of elements on the screen selected, in accordance with embodiments of the disclosure. FIG. 5C illustrates an example second page, subsequent to the example first page of FIGS. 5A and 5B. FIG. 5D illustrates an example third page, subsequent to the example second page of FIG. 5C. It will be understood that while an example media content, namely the United States Declaration of Independence, is displayed on the touch sensitive display screen 150, any suitable media content may be displayed. In certain embodiments, the media content may include any combination of text, images, video, and/or sound. The media content may have multiple pages that may be displayed by the electronic device 110 and associated processors 200 as one or more pages at a time in a paginated manner on the touch sensitive display screen 150.

The touch sensitive display screen 150 is shown with approximate locations of a first predetermined location 510 and a second predetermined location 520 indicated. In one aspect, the touch sensitive display screen 150 and the processors 200 may detect contact by the finger 180 on the touch sensitive display screen 150 at an initial touch location 530. In certain embodiments, the processors 200 may detect this touch at the location 530 to last longer than a predetermined temporal period. The processors 200 may further detect motion of the finger 180 dragging across the touch sensitive display screen 150 from the initial touch location 530 to the first predetermined location 510, as depicted by arrow 534. The processors 200 may further detect the finger 180 to be at the first predetermined location 510 for at least a first temporal period.

Responsive to touching the first predetermined location 510 for a first predetermined period, the electronic device 110 and associated processors 200 may display the second and subsequent page on the touch sensitive display screen 150, as shown in FIG. 5C. At this point, all of the elements, such as text, on the second displayed page may be highlighted and/or otherwise emphasized. Therefore, elements of the media content may be selected, at this point, on both the first page, as shown in FIG. 5B, and on the second page, as shown in FIG. 5C. If the user 120 holds his/her finger 180 at the first predetermined position 510 for a second temporal period, then the display may further change to the next or third page, as shown in FIG. 5D. At this point, the user 120 may move his/her finger 180 along the surface of the touch sensitive display screen 150 from the first predetermined location 510 to a final location 548 as depicted by arrow 544 to deselect portions of the third page. As a result, elements on a first, second, and third page of the media content may be selected by the user 120, as shown in FIGS. 5B, 5C, and 5D.

Figure 6:
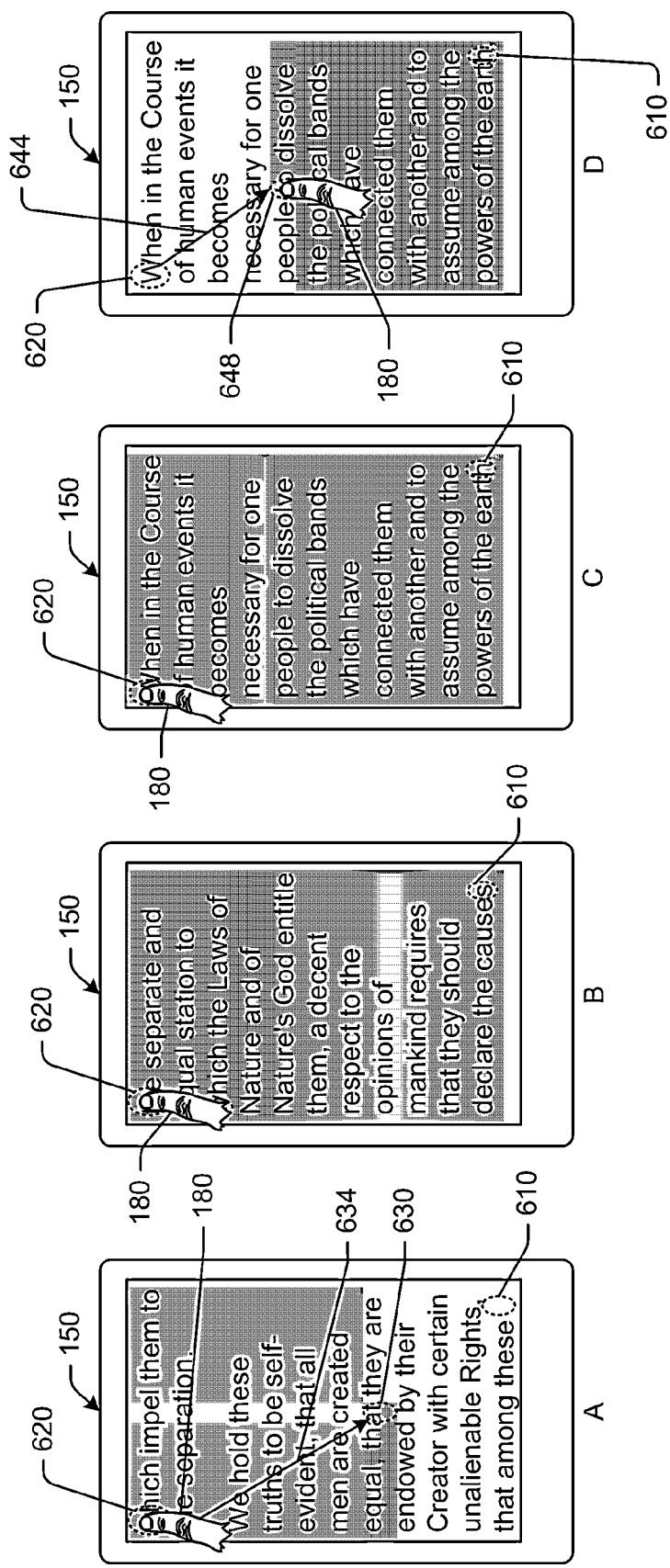
FIGS. 6A, 6B, 6C, and 6D illustrate an example mechanism for selecting text across more than one page in a reverse direction, in accordance with embodiments of the disclosure.

It will be understood that while the first predetermined location is depicted at approximately the bottom right corner of the touch sensitive display screen 150, the first predetermined location may be at any appropriate point on the touch sensitive display screen 150, such as at any point near the bottom of the touch sensitive display screen 150 or proximate to the last word and/or element of the currently displayed page. Similarly, while the second predetermined location is depicted at approximately the top left corner of the touch sensitive display screen 150, the second predetermined location may be at any appropriate point on the touch sensitive display screen 150, such as at any point near the top of the touch sensitive display screen 150 or proximate to the first word and/or element of the currently displayed page. As described above, in certain embodiments, the position on the touch sensitive display screen 150 of the first and second predetermined locations may be ascertained by the processors 200 based at least in part on any variety of metadata associated with the media content. Referring now to FIGS. 6A, 6B, 6C, and 6D, an example mechanism is discussed for selecting text across more than one page in a reverse direction on the electronic device 110 in accordance with embodiments of the disclosure. In particular, FIG. 6A illustrates an example first page on the touch sensitive display screen 150. FIG. 6B illustrates an example second page, prior to the example first page of FIG. 6A. FIG. 6C illustrates an example third page, prior to the example second page of FIG. 6B. FIG. 6D illustrates the same example page as FIG. 6C, with portions of elements on the screen selected, in accordance with embodiments of the disclosure. It will be understood that while an example media content, namely the United States Declaration of Independence, is displayed on the touch sensitive display screen 150, any suitable media content may be displayed. In certain embodiments, the media content may include any combination of text, images, video, and/or sound. The media content may have multiple pages that may be displayed by the electronic device 110 and associated processors 200 as one or more pages at a time in a paginated manner on the touch sensitive display screen 150.

The touch sensitive display screen 150 is shown with approximate locations of a first predetermined location 610 and a second predetermined location 620 indicated. In one aspect, the touch sensitive display screen 150 and the processors 200 may detect contact by the finger 180 on the touch sensitive display screen 150 at an initial touch location 630. In certain embodiments, the processors 200 may detect this touch at the location 630 to last longer than a predetermined temporal period. The processors 200 may further detect motion of the finger 180 dragging across the touch sensitive display screen 150 from the initial touch location 630 to the second predetermined location 620, as depicted by arrow 634. The processors 200 may further detect the finger 180 to be at the second predetermined location 620 for at least a first temporal period.

Figure 7:
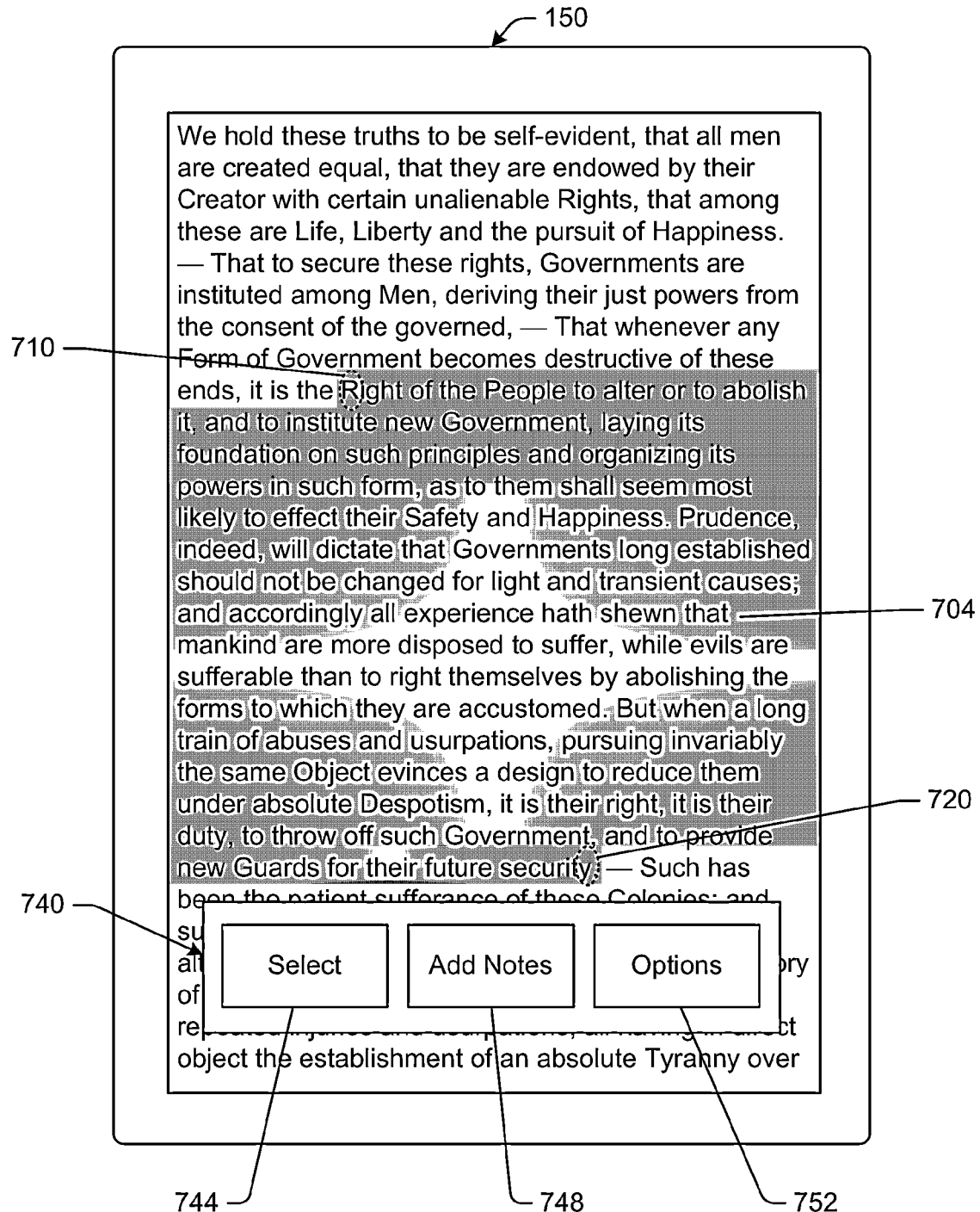
FIG. 7 illustrates an example mechanism for selecting text and displaying a control menu, in accordance with embodiments of the disclosure.

Responsive to touching the second predetermined location 620 for a first predetermined period, the electronic device 110 and associated processors 200 may display the second and prior page on the touch sensitive display screen 150, as shown in FIG. 6B. At this point, all of the elements, such as text, on the second displayed page may be highlighted and/or otherwise emphasized. Therefore, elements of the media content may be selected, at this point, on both the first page, as shown in FIG. 6A, and on the second page, as shown in FIG. 6B. If the user 120 holds his/her finger 180 at the second predetermined position 620 for a second temporal period, then the display may further change to the previous or third page, as shown in FIG. 6C. At this point, the user 120 may move his/her finger 180 along the surface of the touch sensitive display screen 150 from the first predetermined location 610 to a final location 648 as depicted by arrow 644 to deselect portions of the third page. As a result, elements on a first, second, and third page of the media content may be selected by the user 120, as shown in FIGS. 6A, 6B, and 6D. Referring now to FIG. 7, an example mechanism is discussed for selecting text and displaying a control menu associated with a selection on the electronic device 110 in accordance with embodiments of the disclosure. A block of selected text 704 between a first location 710 and a second location 720 on the touch sensitive display screen 150 may be selected using any variety of methods and/or mechanisms described herein. While the selection 704 is depicted on a single page of the media content, the control menu associated with this embodiment may apply to selections that span more than one page of the rendered media content. When the user 120 lifts his/her finger 180 from the touch sensitive display screen 150, the one or more processors 200 of the electronic device 110 may render a control menu 740 on the touch sensitive display screen 150 on or in relative proximity to the selection 704. The control menu 740 may have one or more control buttons and/or virtual control buttons, such as "Select" button 744, "Add Notes" button 748, and/or "Options" button 752. The example buttons 744, 748, 752 are representative in nature, and it will be appreciated that there may be any variety and/or number of buttons that may be displayed on the control menu 740. When one or more of the control buttons are selected, such as by touching with finger 180, the electronic device 110 may perform one or more actions that correspond to the selected buttons 744, 748, 752. For example, the processors 200 may be configured to add a note to the selection if the button "Add Notes" 748 is selected by the user 120.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
at least one memory that stores computer-executable instructions;
a touch sensitive display screen configured to render a display and detect contact from a contacting element with the at least one touch sensitive display screen;
at least one processor configured to control the display on the at least one touch sensitive display screen, receive an indication of contact with the at least one touch sensitive display screen, and access the at least one memory, wherein the at least one processor is configured to execute the computer-executable instructions to:
display a first page associated with a media content on the touch sensitive display screen, wherein the media content comprises a sequence of media elements arranged as a sequence of pages, each page comprising one or more media elements;
while the first page is displayed, identify a first location on the touch sensitive display screen that has been contacted by the contacting element for a first period of time;
identify a first media element corresponding to the first location on the first page;
detect movement of the contacting element to a predetermined location on the touch sensitive display screen while the first page is displayed and while the contacting element is in contact with the touch sensitive display screen;

highlight one or more elements on the first page corresponding to at least a portion of media elements located between the first location and the predetermined location;

determine that the contacting element is in contact with the predetermined location for a second period of time and responsive to detecting the contact for the second period of time, display a second page of the media content and highlight all media elements of the second page;

sequentially display one or more pages of the media content every third period of time while the contacting element continues to be in contact with the predetermined location while highlighting all media elements of each of the one or more pages;

detect movement of the contacting element to a second location on the touch sensitive display screen and identify a second media element corresponding to the second location on a currently displayed page;

remove the highlighting from media elements between the predetermined location and the second location on the currently displayed page, wherein the currently displayed page is different from the first page; and provide a selection of media elements comprising the first media element, the second media element, and all of media elements between the first media element and second media element.

2. The system of claim 1, wherein the media elements are at least one of: (i) text; (ii) an image; (iii) a sound; or (iv) a video.

3. The system of claim 1, wherein the predetermined location is substantially at a top left portion of the touch sensitive display screen and the currently displayed page precedes the first page.

4. The system of claim 1, wherein the predetermined location is substantially at a bottom right portion of the sensitive display screen and the currently displayed page is subsequent to the first page.

5. The system of claim 1, wherein providing the selection of media elements further comprises detecting that the contacting element is no longer in contact with the touch sensitive display screen.

6. The system of claim 1, further comprising displaying a control menu on the touch sensitive display screen when the selection of media elements has been provided.

7. The system of claim 6, wherein the third period of time is longer than the second period of time.

8. A method, comprising:
detecting, by an electronic device comprising one or more processors, contact of a contacting element at a first location on a touch sensitive display screen while a first page of media content is displayed on the touch sensitive display screen;

identifying a first media element corresponding to the first location, wherein the media content is a sequence of media elements arranged in a sequence of pages;

detecting, by the electronic device, movement of the contacting element to a predetermined location of the touch sensitive display screen and contact with the predetermined location for a first period of time while the first page of the media content is displayed;

responsive to detecting the contact at the predetermined location for the first period of time while the first page is displayed, displaying, by the electronic device, a second page associated with the media content on the touch sensitive display screen and highlighting all media elements on the second page;

detecting contact of the contacting element at the predetermined location for a second period of time while displaying the second page and responsive to detecting the contact at the predetermined location for the second period of time, displaying, by the electronic device, a third page associated with the media content on the touch sensitive display screen and highlighting all media elements on the third page;

detecting, by the electronic device, movement of the contacting element to a second location of the touch sensitive display screen and identifying a second media element corresponding to the second location on the third page;

removing, by the electronic device, the highlighting from media elements between the predetermined location and the second location on a currently displaced page, wherein the currently displayed page is different from the first page; and providing a selection of media elements comprising the first media element, the second media element, and all media elements between the first and second media elements.

9. The method of claim 8, wherein the media elements are at least one of: (i) text; (ii) an image; (iii) a sound; or (iv) a video.

10. The method of claim 8, wherein the predetermined location is substantially at a top left portion of the touch sensitive display screen and the second page precedes the first page.

11. The method of claim 8, wherein the predetermined location is substantially at a bottom right portion of the touch sensitive display screen and the second page is subsequent to the first page.

12. The method of claim 8, wherein the identification of the selection of media elements further comprises detecting that the contacting element is no longer in contact with the touch sensitive display screen.

13. The method of claim 8, further comprising displaying a control menu on the touch sensitive display screen when the selection of media elements has been identified.

14. The method of claim 8, wherein highlighting media elements comprises at least one of: (i) bolding the media element; (ii) changing the color of the media element; (iii) italicizing the media element; or (iv) changing a color of a background of the media element.

15. The method of claim 8, wherein the second period of time is longer than the first period of time.

16. The method of claim 8, further comprising copying, by the electronic device, the selection of media elements to a memory.

17. The method of claim 8, wherein detecting contact of a contacting element at the first location comprises detecting the contact of the contacting element at the first location for a third period of time.

18. The method of claim 8, wherein at least one of the first period of time or the second period of time is configured based at least in part on user input.

19. At least one non-transitory computer-readable medium comprising computer-executable instructions that, when executed by one or more processors, executes a method comprising:

detecting contact at a first location on a touch sensitive display screen while a first page of a media content comprising a plurality of pages is displayed on the touch sensitive screen;

displaying a subsequent page to the first page if contact is detected at a first predetermined location on the touch sensitive display screen and highlighting all media elements of the subsequent page;

displaying a prior page to the first page if contact is detected at a second predetermined location on the touch sensitive display screen and highlighting all media elements of the prior page;

continuing to display the first page if neither the first nor the second predetermined locations are contacted;

detecting contact at a second location on the touch sensitive display screen;

removing the highlighting from media elements between one of: (i) the first predetermined location and the second location on the subsequent page, or (ii) the second predetermined location and the second location on the prior page; and providing a selection of media elements located between the first location on the first page and the second location on a current page of the media content that is displayed.

20. The at least one non-transitory computer-readable medium of claim 19, wherein the media content is a sequence of media elements and a sequence of pages, each page comprising one or more media elements.

21. The at least one non-transitory computer-readable medium of claim 20, wherein the media elements are at least one of: (i) text; (ii) an image; (iii) a sound; or (iv) a video.

22. The at least one non-transitory computer-readable medium of claim 19, wherein the position of at least one of (i) the first predetermined location or (ii) the second predetermined location is based at least in part on one or more of: (i) metadata associated with the media content; (ii) language of the media content; or (iii) orientation of media elements of the media content.

23. The at least one non-transitory computer-readable medium of claim 19, wherein the first predetermined location is substantially at a bottom right portion of the touch sensitive display screen and the second predetermined location is substantially at a top left portion of the touch sensitive display screen.

24. The at least one non-transitory computer-readable medium of claim 19, wherein detecting contact at a first location on a touch sensitive display screen comprises detecting the contact for a first period of time.

25. The at least one non-transitory computer-readable medium of claim 19, wherein detecting contact at a first location on a touch sensitive display screen comprises identifying a first media element of the media content corresponding to the first location.

26. The at least one non-transitory computer-readable medium of claim 25, wherein detecting contact at a second location on a touch sensitive display screen comprises identifying a second media element of the media content corresponding to the second location.

27. The at least one non-transitory computer-readable medium of claim 26, wherein providing a selection of media elements comprises identifying the first media element, the second media element and at least a portion of media elements between the first and second media elements as part of the selection of media elements.

* * * * *